United States Patent
Twu et al.

(10) Patent No.: US 11,628,700 B2
(45) Date of Patent: Apr. 18, 2023

(54) VEHICLE SUSPENSION SYSTEM ARCHITECTURE FOR MINIMIZED SMALL OVERLAP FRONTAL IMPACT EFFECTS

(71) Applicant: GM GLOBAL TECHNOLOGY OPERATIONS LLC, Detroit, MI (US)

(72) Inventors: Sung-ling Twu, Troy, MI (US); Ferdous M Z Ghazi, Troy, MI (US); Fred M Marquardt, Commerce, MI (US); Zohir Molhem, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 28 days.

(21) Appl. No.: 17/444,393

(22) Filed: Aug. 4, 2021

(65) Prior Publication Data
US 2023/0038254 A1 Feb. 9, 2023

(51) Int. Cl.
*B60G 7/02* (2006.01)
*B60G 3/20* (2006.01)
*B60K 5/12* (2006.01)

(52) U.S. Cl.
CPC ........... *B60G 7/02* (2013.01); *B60G 3/20* (2013.01); *B60K 5/1241* (2013.01); *B60G 2200/144* (2013.01); *B60G 2200/44* (2013.01); *B60G 2204/147* (2013.01)

(58) Field of Classification Search
CPC ......... B60G 7/001; B60G 7/008; B60G 7/02; B60G 2204/147; B60G 7/005; B60G 2204/416; B60G 2204/43; B60K 5/1241; B62D 7/18
See application file for complete search history.

(56) References Cited

U.S. PATENT DOCUMENTS

| | | | | |
|---|---|---|---|---|
| 6,994,374 B2* | 2/2006 | Miyasaka | ................ | B60G 7/02 280/784 |
| 9,561,700 B2* | 2/2017 | Kraschienski | ........... | B60G 7/02 |
| 9,688,315 B2* | 6/2017 | Peschansky | ....... | B62D 25/2009 |
| 10,023,018 B2* | 7/2018 | Saudemont | .......... | B62D 21/155 |
| 10,150,344 B2* | 12/2018 | Larsson | ................... | B60G 7/02 |
| 10,766,326 B2* | 9/2020 | Hata | ....... | B62D 21/15 |
| 10,822,027 B2* | 11/2020 | Karlsson | ................. | B62D 7/18 |
| 11,465,684 B2* | 10/2022 | Okamoto | ................. | B60G 7/02 |
| 2002/0180171 A1* | 12/2002 | Hasebe | ..................... | B60G 7/02 280/124.134 |
| 2015/0329143 A1* | 11/2015 | Fujita | ....................... | B60G 7/02 280/784 |

* cited by examiner

*Primary Examiner* — Paul N Dickson
*Assistant Examiner* — Tiffany L Webb
(74) *Attorney, Agent, or Firm* — Lorenz & Kopf LLP (57) ABSTRACT

Suspension systems are provided where the lower control arm is allowed to separate from the engine cradle at prescribed conditions to deliver the proper wheel kinematics for select cases while maintaining structural integrity for all other load cases. A system includes a vehicle body structure, a wheel assembly, and a suspension system linking the wheel assembly to the engine cradle. The suspension system includes a link coupled with the engine cradle through a first joint and coupled with the wheel assembly through a second joint. The first joint is configured to release the link from the engine cradle under loads above a threshold force and above a threshold angle of the threshold force at the second joint, to provide the desired kinematics.

20 Claims, 8 Drawing Sheets

VEHICLE SUSPENSION SYSTEM ARCHITECTURE FOR MINIMIZED SMALL OVERLAP FRONTAL IMPACT EFFECTS

INTRODUCTION

The present disclosure generally relates to the field of vehicle suspension systems and more specifically, to an architectural strategy for suspension systems providing minimized effects from small overlap frontal impacts.

Vehicles and other equipment and machinery include suspension systems that help dampen oscillations for purposes such as to provide stability, a comfortable ride, and preferred handling characteristics. A vehicle suspension system typically includes dampers and springs that act between the sprung (vehicle body) and unsprung (wheel assembly) masses. It is desirable to provide an economical and fast responding suspension system that delivers performance characteristics that instantaneously manage road and other inputs.

Suspension systems include various types of linked connections between the sprung and the unsprung masses of the vehicle. During vehicle operation the vehicle and/or its wheels may encounter a variety of surfaces and objects that impart loads on and through the suspension system. Suspensions are generally designed to meet various requirements related to durability and fastened joint integrity. The performance of the vehicle, including the suspension system in response to the various loads and conditions encountered is evaluated during product development. A number of simulations may be conducted to evaluate the vehicle's performance such as a moderate overlap frontal test (MOF), a small overlap frontal test (SOF), a curb abuse load test (CAL), and others. These tests are conducted to simulate conditions such as impacts with other vehicles or objects such as a barrier or a curb. Minimized effects resulting from these impacts is preferred.

It is desirable to provide a suspension system that results in the minimization of the effects of impact loads. Furthermore, other desirable features and characteristics of the present invention will become apparent from the subsequent detailed description and the appended claims, taken in conjunction with the accompanying drawings and the foregoing technical field and background.

SUMMARY

Systems are provided that deliver a suspension architectural strategy for minimizing impact effects. In various embodiments, a system includes a vehicle body structure with an engine cradle, a wheel assembly, and a suspension system linking the wheel assembly to the vehicle body structure. The suspension system includes a link coupled with the vehicle body structure through a first joint and coupled with the wheel assembly through a second joint. The first joint is configured to release the link from the vehicle body structure under loads above a threshold force and above a threshold angle of the threshold force at the second joint, to provide the desired kinematics.

In additional embodiments, the link is a lower control arm that controls movement of the wheel assembly relative to the vehicle body structure in both a longitudinal direction and a lateral direction.

In additional embodiments, a bolt is included in the first joint and has a shaft diameter. The bolt connects the link to the engine cradle. The engine cradle defines an opening through which the bolt extends, and the opening has a main region and an auxiliary region joined with the main region by a passage. The passage has a width smaller than the shaft diameter of the bolt. The first joint holds the bolt in the main region to enable the bolt to move to the auxiliary region to initiate a separation of the link from the engine cradle.

In additional embodiments, a steering knuckle is connected between the wheel assembly and the link, wherein the second joint is a ball joint at the steering knuckle and wherein the threshold angle is fifty degrees relative to a longitudinal direction of the engine cradle.

In additional embodiments, a bracket is included in the engine cradle, wherein the bracket includes a forward flange defining a first opening and a rearward flange defining a second opening, wherein the first opening includes a main section and an auxiliary section connected with the main section by a passage defined by a pair of projecting lips forming a necked-down section of the first opening at the passage.

In additional embodiments, the forward flange includes an outboard end and a tear-out section between the first opening and the outboard end, where the tear-out section is configured to tear from the forward flange during the loads above the threshold force and above the threshold angle.

In additional embodiments, a rocker is included in the vehicle body structure, wherein the select kinematics comprise directing the wheel assembly through a trajectory directed at the rocker.

In additional embodiments, the link is configured to buckle at the loads when greater than a buckling force of the link, when the loads are also directed at angles, relative to a vehicle longitudinal direction, of less than fifty-degrees.

In additional embodiments, the engine cradle includes a bracket with a flange defining an opening, and comprising, a bushing with a bolt extending through the opening and the bushing to connect the link with the engine cradle.

In additional embodiments, the opening has a main region and an auxiliary region joined with the main region by a passage, wherein the bolt is retained in the main region for load cases below the threshold force and the threshold angle.

In a number of additional embodiments, a system includes a vehicle body structure with an engine cradle. A suspension system links a wheel assembly to the engine cradle, and includes a link coupled with the engine cradle by a first joint and coupled with the wheel assembly through a second joint. The first joint is configured to release the link from the engine cradle under loads on the wheel assembly above a threshold force and above a threshold angle of the threshold force at the second joint, to impart select kinematics to the wheel assembly including directing the wheel assembly through a trajectory selected to minimize deformation of the vehicle body structure.

In additional embodiments, the suspension system comprises a strut-type suspension system and the link is embodied as a lower control arm configured to control movement of the wheel assembly relative to the engine cradle in both a longitudinal direction and a lateral direction.

In additional embodiments, a bolt is included in the first joint and has a shaft diameter. The bolt connects the link to the engine cradle. The engine cradle defines a bracket with an opening through which the bolt extends, where the opening has a main region and an auxiliary region joined with the main region by a passage. The passage has a width smaller than a diameter of the bolt. The first joint is configured to hold the bolt in the main region and to enable the bolt to move to the auxiliary region to initiate a separation of the link from the vehicle body structure by tearing a tear-out section of the bracket.

In additional embodiments, a steering knuckle is connected between the wheel assembly and the link, wherein the second joint is a ball joint at the steering knuckle and wherein the threshold angle is at the ball joint, and is defined relative to a longitudinal direction of the vehicle body structure.

In additional embodiments, the engine cradle includes a bracket, wherein the bracket includes a forward flange defining a first opening and includes a rearward flange defining a second opening. The first opening includes a main section and an auxiliary section connected with the main section by a passage defined by a pair of projecting lips forming a necked-down section of the first opening at the passage.

In additional embodiments, the forward flange includes an outboard end and defines a tear-out section disposed between the first opening and the outboard end. The tear-out section is configured to tear from the forward flange during the loads above both the threshold force and the threshold angle.

In additional embodiment, a rocker is defined across a bottom of a door opening of the vehicle body structure, wherein the select kinematics comprise directing the wheel assembly through the trajectory directed at the rocker in a longitudinal direction of the vehicle body structure.

In additional embodiments, the link is configured to buckle at the loads when the loads embody a force greater than a buckling force of the link, and when the loads are directed at angles, relative to a vehicle longitudinal direction, of less than the threshold angle.

In additional embodiments, the engine cradle includes a bracket with a flange defining an opening, with a bolt extending through the opening and a bushing connects the link with the engine cradle. The opening has a main region and an auxiliary region joined with the main region by a passage. The bolt is retained in the main region for load cases below the threshold force and the threshold angle.

In a number of other embodiments, a system includes a vehicle body structure with a rocker, an engine cradle, and a bracket. A wheel assembly is linked with the engine cradle. A suspension system links the wheel assembly to the engine cradle, and includes a link coupled with the engine cradle at the bracket by a first joint and coupled with the wheel assembly through a second joint. The first joint is configured to release, by tearing of the bracket, the link from the vehicle body structure under loads on the wheel assembly above a threshold force and above a threshold angle of the threshold force at the second joint, to impart select kinematics to the wheel assembly including directing the wheel assembly through a trajectory toward the rocker to minimize deformation of the vehicle body structure.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

As disclosed herein, systems are provided that deliver a suspension architectural strategy for minimizing impact effects on the vehicle's body structure. In various embodiments, desirable performance outcomes are accomplished by a system that includes a set of features that permit a suspension link such as a lower control arm (LCA) to separate from the vehicle body structure connection (such as at an engine cradle) at prescribed conditions. This achieves desirable wheel kinematics for specific cases while maintaining suspension structural integrity for all other load cases. In most load cases, there is no joint slippage, and with increasing loads the LCA will buckle first under large loads directed at less than a specified angle at the ball joint relative to the vehicle's longitudinal direction. In specific impact cases with substantial loads, the LCA separates from the vehicle body structure leading to desirable wheel kinematics. The delivered architectural solution strategy minimizes complexity related to variations, such as due to wheel styling, that may arise downstream in the development cycle. Wheel kinematics are desirably controlled without significant mass increases in the vehicle body structure.

In various embodiments, a system that delivers desirable wheel kinematics includes a vehicle body structure, a wheel assembly, and a suspension system linking the wheel assembly to the vehicle body structure. The suspension system includes a link coupled to the vehicle body structure by a joint. In a number of embodiments, the link may be a lower control arm. A bolt in the joint has a shaft diameter and connects the link to the vehicle body structure. The vehicle body structure defines an opening through which the bolt extends. The opening has a main region and an auxiliary region joined with the main region by a passage. The passage has a width that is smaller than the diameter of the bolt. The joint holds the bolt in the main region and in select load conditions, enables the bolt to move to the auxiliary region to initiate tearing and a separation of the link from the vehicle body structure. A beneficial result is minimization of deformation of the vehicle body structure, by guiding the wheel's trajectory into a high strength area such as the vehicle's rocker. Performance is tunable, including by optimizing the opening's shape and geometry, the material grades, and the material gages.

Figure 1:
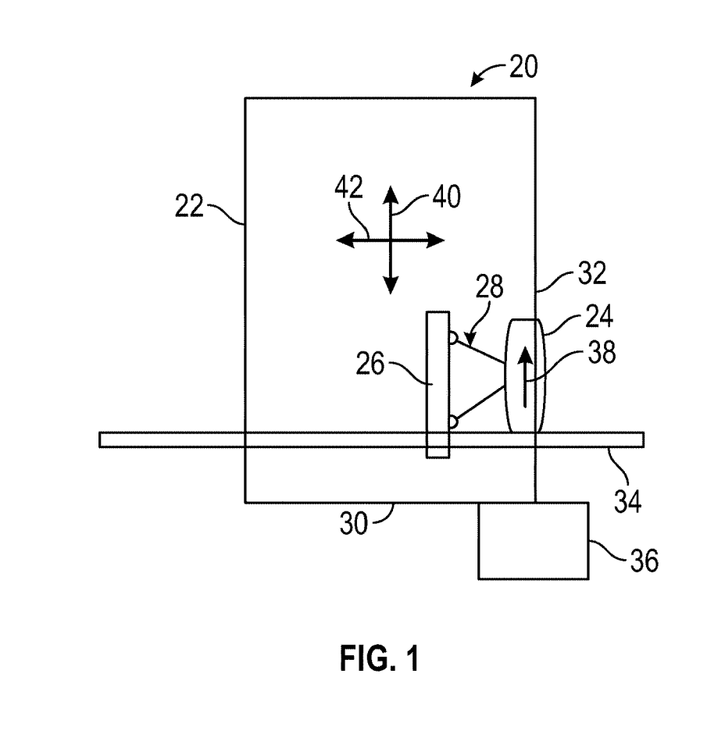
FIG. 1 is a schematic illustration of a vehicle undergoing various tests, in accordance with various embodiments.

Referring to FIG. 1, scenarios related to a vehicle 20 are schematically illustrated. In general, the vehicle 20 includes a body structure 22, a wheel assembly 24, and a suspension system 28 linking the wheel assembly 24 with the body structure 22. In the current embodiment, the suspension system 28 is connected with a structural element of the body structure 22 and specifically an engine cradle 26. The vehicle 20 includes a front end 30, and accordingly the wheel assembly 24 is a front wheel. It will be appreciated that the current disclosure is not limited to any particular wheel location and is applicable to any wheel of a vehicle. The body structure 22 includes a rocker 32 located rearward from the wheel assembly 24. The suspension system 28 includes a number of elements including a link 33 in accordance with various embodiments. As noted above, various metrics/tests may be evaluated/conducted to assess the performance of the vehicle 20.

The vehicle 20 may be operated over a wide range of conditions and situations that may be considered in product development. In the real world, the wheel assembly 24 may encounter a variety of irregular surfaces and objects, such as an object 34. For example, the object 34 may be a curb along the edge of a roadway. If the wheel assembly 24 where to encounter the object 34, loads will be experienced, which the suspension system 28 is designed to withstand and remain intact and functional. One tool in assessing the performance of the vehicle 20 including the suspension system 28 in such a scenario is the CAL, which simulates the vehicle 20 driving over the curb/object 34.

Other real-world operational scenarios of the vehicle 20 may include impacts such as by the front end 30 with an object 36. The object 36 may be another vehicle or a barrier of a variety of types that may exist along roadways. In some such scenarios, it has been found that enabling separation of the link 33 from the body structure 22 is beneficial. For example, separation of the link 33 may direct the wheel assembly 24 through a trajectory 38 directed at the rocker 32. This minimizes damage to the body structure 22 since the rocker exhibits high strength, particularly in the longitudinal direction 40 of the vehicle 20, which direction the trajectory 38 generally matches. The longitudinal direction 40 is directed front-to-back of the vehicle 20. The lateral direction 42 of the vehicle 20 is perpendicular to the longitudinal direction 42 and is directed side-to-side. One tool in assessing the performance of the vehicle 20 including the suspension system 28 in such a scenario is the SOF, which simulates the vehicle 20 driving into, or otherwise encountering, the offset object 36.

Figure 2:
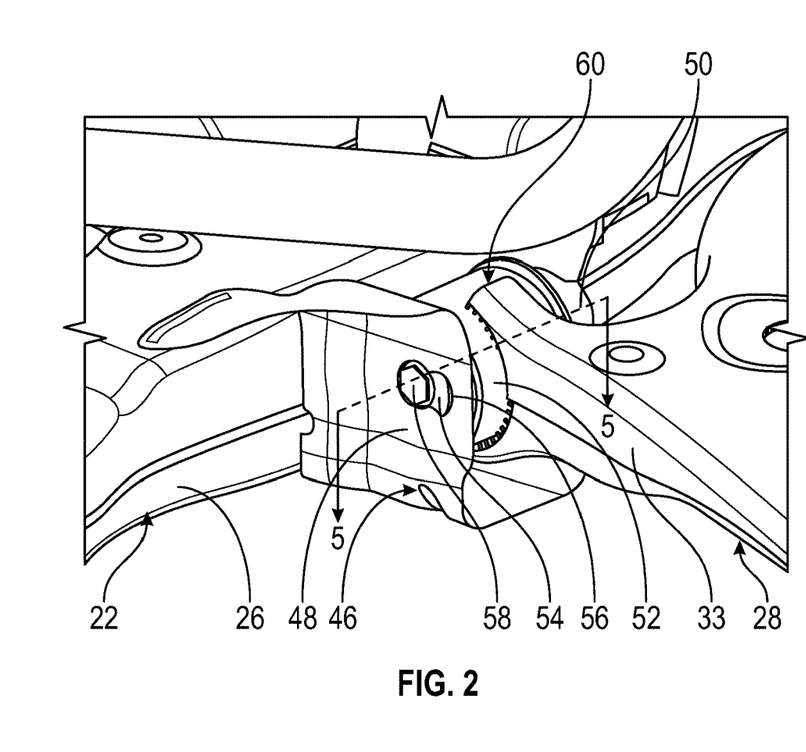
FIG. 2 is a perspective illustration of a lower control arm joint of the vehicle of FIG. 1, in accordance with various embodiments.

Referring to FIG. 2, the suspension system 28 includes the link 33, which in this case is embodied as a part of a LCA. A bracket 46 is connected with the engine cradle 26 of the body structure 22. The bracket 46 includes a forward flange 48 and a rearward flange 50. The link 33 includes a socket 52 that is disposed between the forward flange 48 and the rearward flange 50. A bushing 54 is disposed in the socket 52 and an opening 56 is provided in the forward flange 48. In this embodiment, the bushing 54 includes a resilient material and is a mounted in the suspension system 28 to absorb displacements, control the amount of movement in the joint 60 and reduce noise and vibration. A bolt 58 extends through the forward flange 48, the bushing 54, and the rearward flange 50, coupling the link 33 with the body structure 22 at the joint 60.

Figure 3:
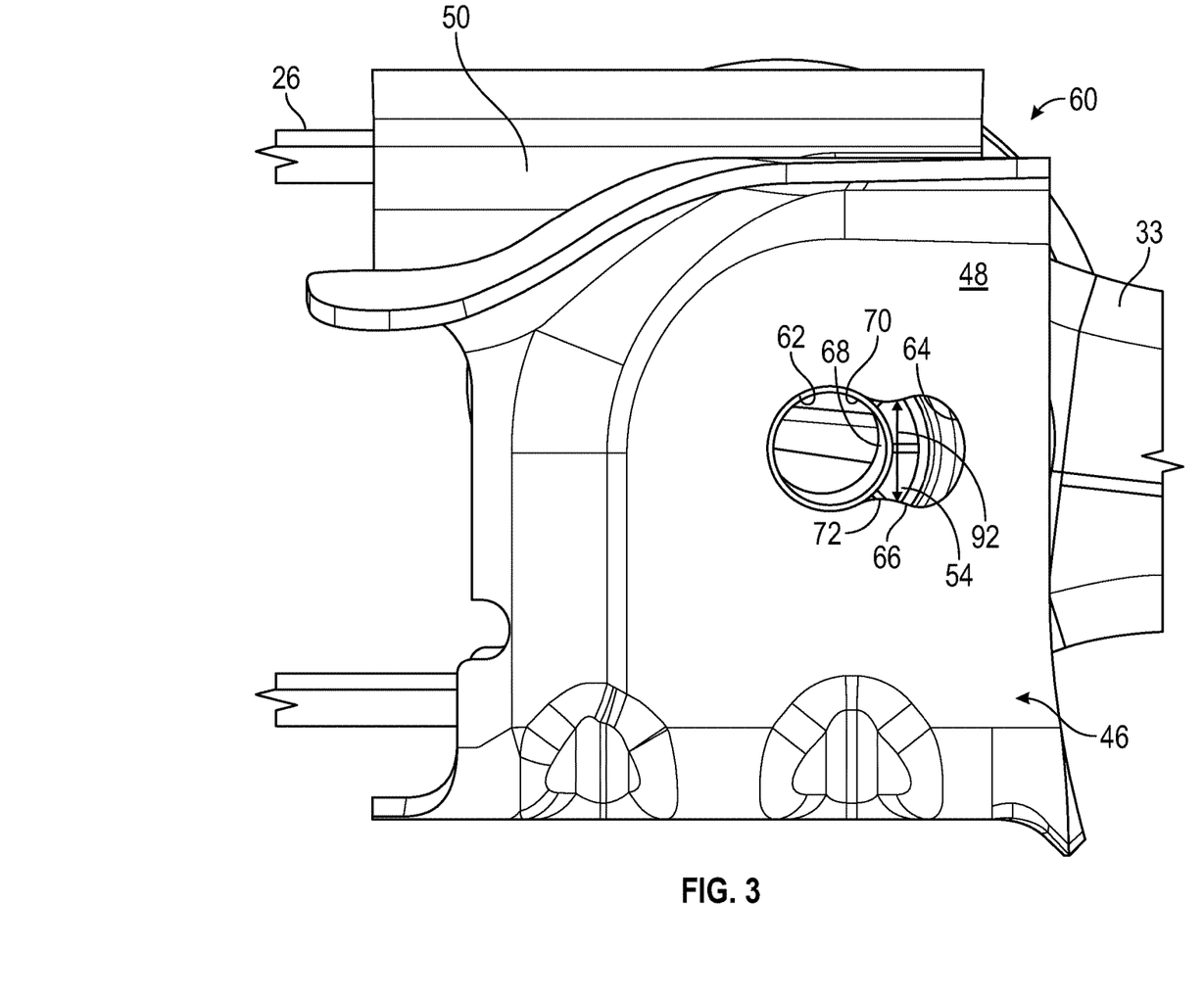
FIG. 3 is a perspective view of the joint of FIG. 2 with bolt omitted for visibility, in accordance with various embodiments.

Referring to FIG. 3, the joint 60 is shown with the bolt 58 omitted for visibility of the opening 56. The opening 56 extends completely through the forward flange 48 and includes a main region 62 that is generally circular in shape and an auxiliary region 64 joined with the main region 62 by a passage 66. The main region 62 is aligned with an opening 68 that extends through the bushing 54. The main region 62 and the opening 68 are sized to receive the bolt 58. The auxiliary region 64 is formed by a number of radii further described below, and the passage 66 is shaped as a necked down section of the opening 56 formed by projecting lips 70, 72.

Figure 4:
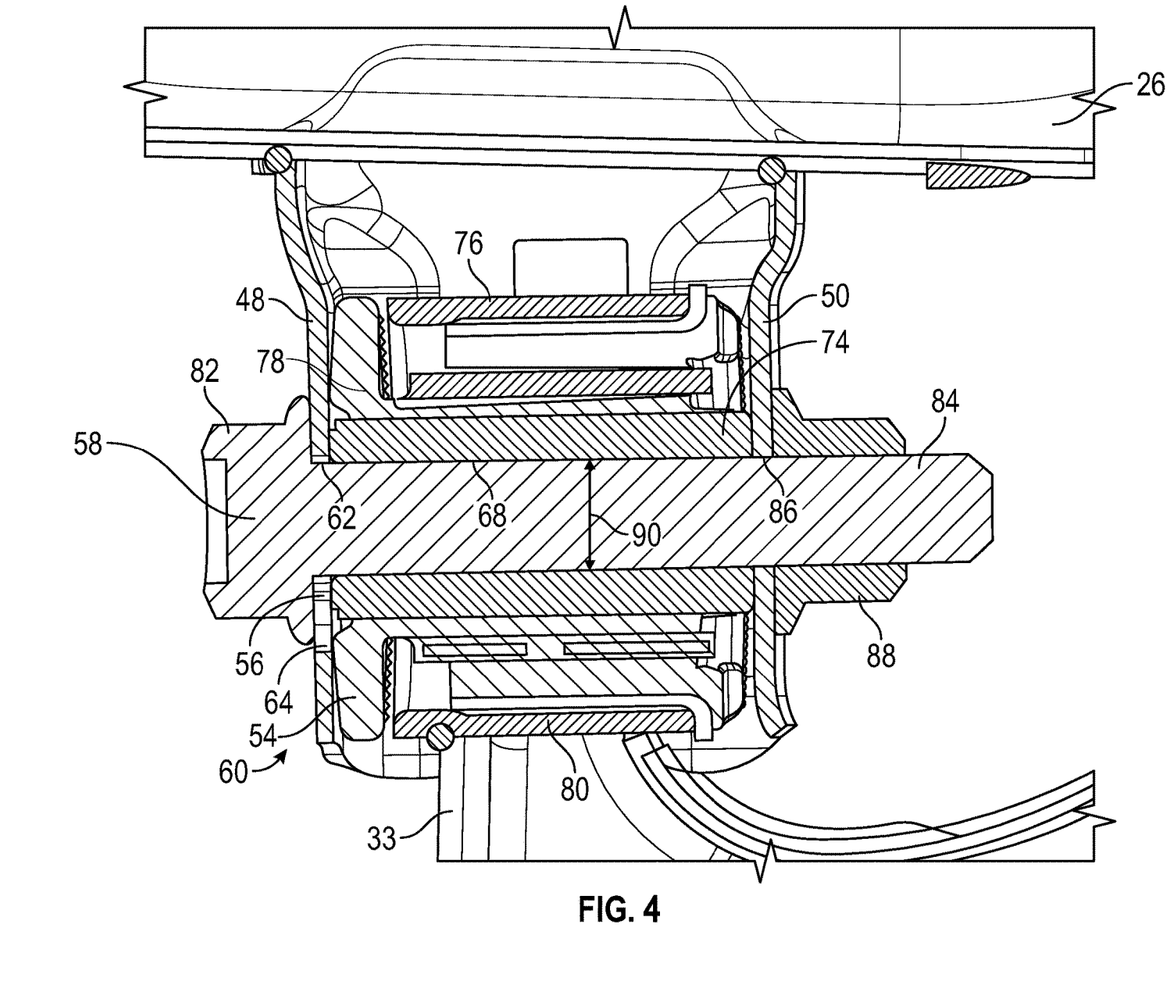
FIG. 4 is a cross sectional illustration taken generally through the line 4-4 indicated in FIG. 1, in accordance with various embodiments.

In FIG. 4, the joint 60 is shown in sectioned and assembled form. The bushing 54 comprises an assembly with a sleeve 74, a case 76, a resilient element 78 and stiffeners 80. The bushing 54 fits between the forward flange 48 and the rearward flange 50 with sleeve 74 defining the opening 68. The rearward flange 50 defines an opening 86 that is aligned with the opening 68. The bolt 58 includes a head 82 and a shaft 84 that extends through each of the openings 56, 68 and 86. The bolt 58 is secured by the head 82 and a nut 88 threaded onto the shaft 84, with the shaft 84 disposed in the main region 62. The shaft 84 of the bolt 58 has a diameter 90 and the passage 66 has a width 92 (shown in FIG. 3), measured at the smallest gap between the lips 70, 72. The width 92 is smaller in size than the diameter 90 of the bolt 58 so that the shaft 84 is normally retained within the main region 62 under most load conditions encountered by the vehicle 20.

Figure 5:
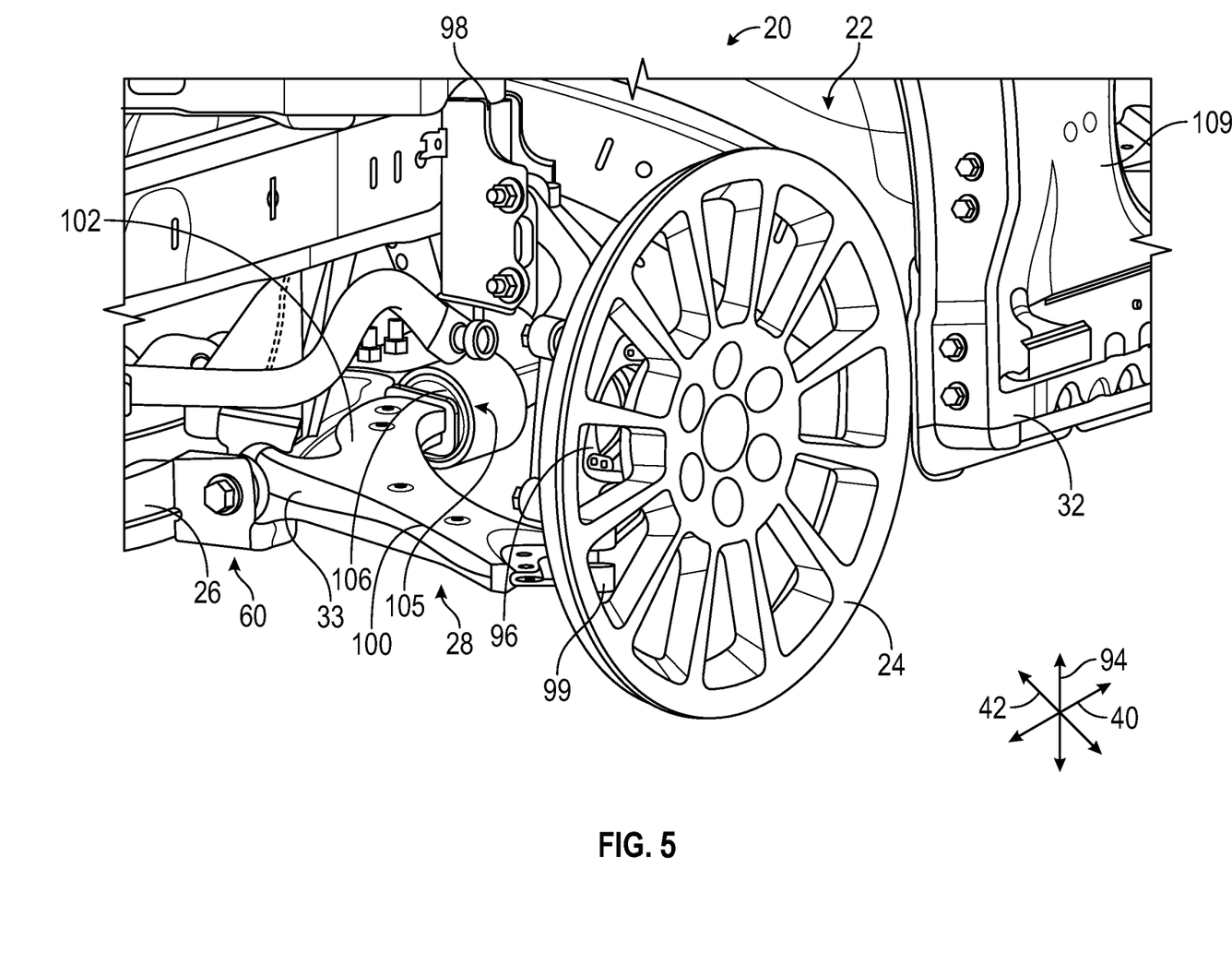
FIG. 5 is a schematic perspective illustration of the vehicle of FIG. 1 in a normal suspension state, in accordance with various embodiments.

The joint 60 is illustrated schematically along with other details of the vehicle 20 in FIG. 5, to which reference is directed. In the current embodiment, the suspension system 28 is a strut type of construction which controls movement of the wheel assembly 24 in the longitudinal direction 40, the lateral direction 42 and in a vertical direction 94. The left front wheel assembly 24 is illustrated as an example. The current disclosure is not limited to a specific type of suspension or wheel location but rather is broadly applicable to applications where releasable linking for kinematics is desirable. The wheel assembly 24 is coupled with a steering knuckle 96 to which a strut type damper 98 is attached for controlling vertical displacements. The lower control arm 100 connects between the steering knuckle 96 and the engine cradle 26 and is embodied as a wishbone type element that combines the link 33 with another link 102. The link 102 is connected with the engine cradle 26 at a joint 105 through a bushing 106, and controls movement of the wheel assembly 24 in the longitudinal direction 40. The link 33 and the joint 60 control movement of the wheel assembly 24 in the lateral direction 42. The lower control arm 100 is connected with the steering knuckle 96 at a ball joint 99. The suspension system 28, including the joint 60, remains intact and functional throughout most operational scenarios of the vehicle 20, including CAL type cases, absorbing and managing inputs to/through the wheel assembly 24.

Figure 6:
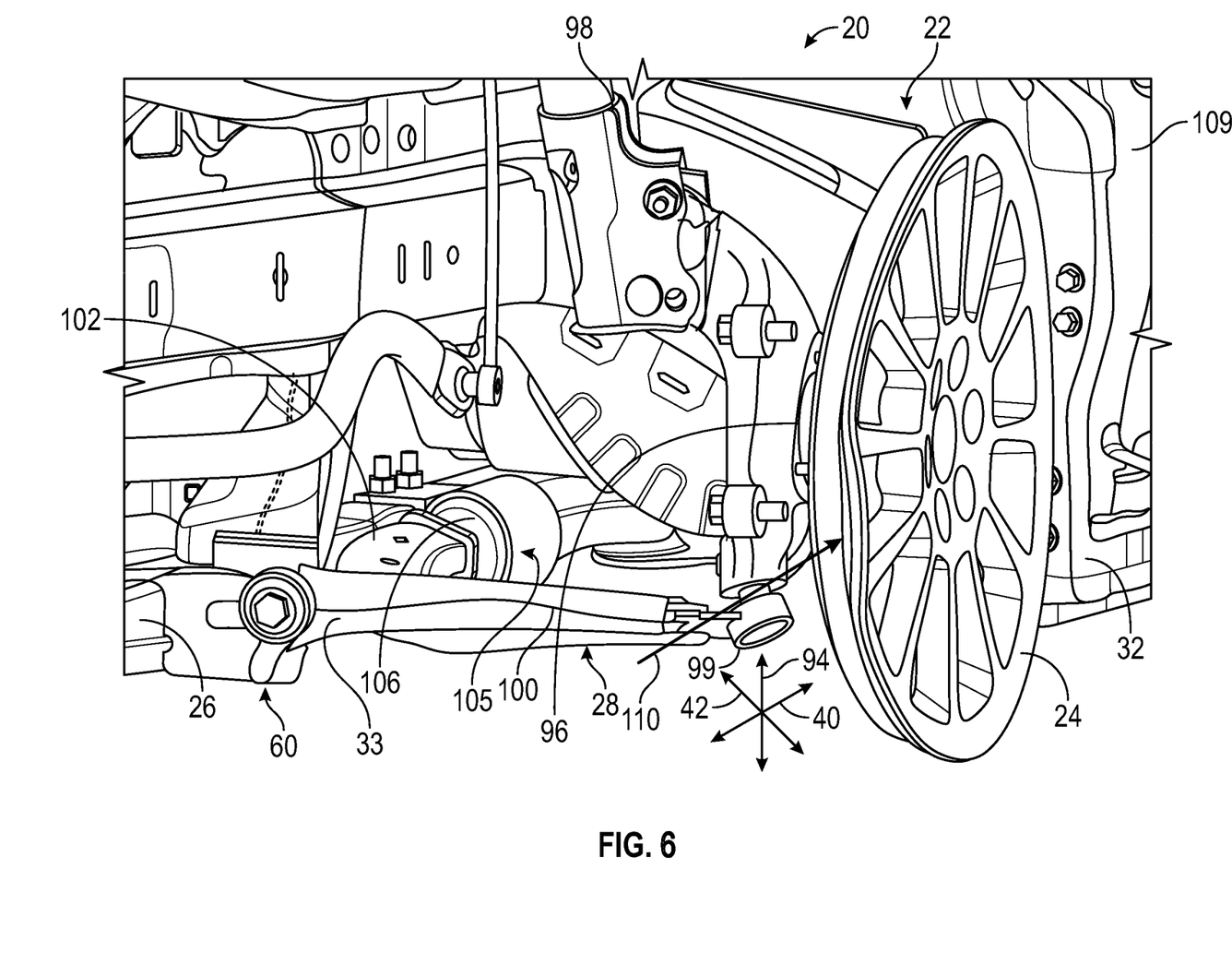
FIG. 6 is a schematic perspective illustration of the vehicle of FIG. 1 in a releasing suspension state, in accordance with various embodiments.
Figure 7:
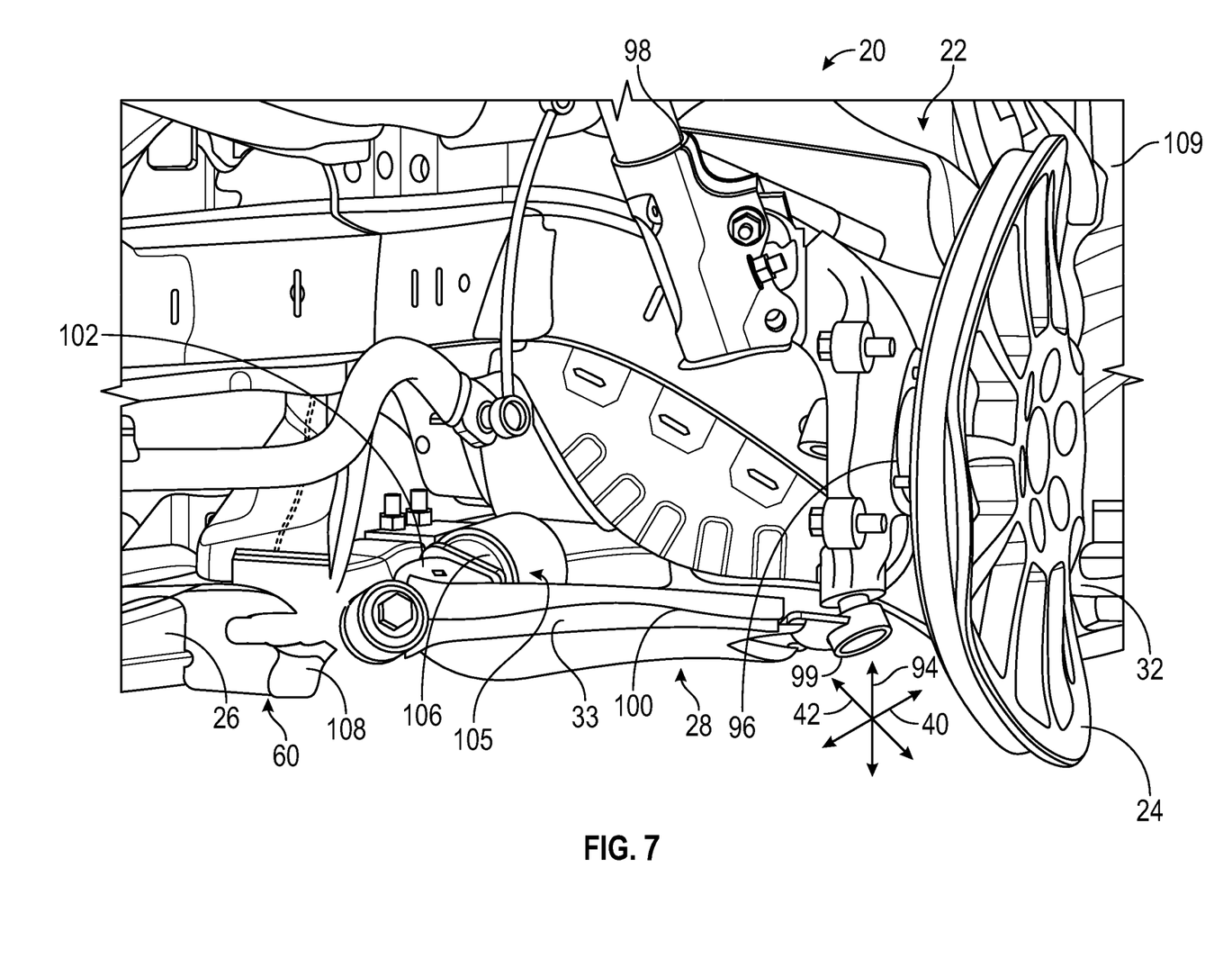
FIG. 7 is a schematic perspective illustration of the vehicle of FIG. 1 in a released suspension state, in accordance with various embodiments.

Referring to FIG. 6, operation of the vehicle in a SOF type case is illustrated. A load 110 imparted on the wheel assembly 24 in the SOF type case applies a load on the joint 60, which includes a lateral component that pulls the shaft 84 of the bolt 58 laterally through the passage 66 and into the auxiliary region 64. Referring additionally to FIG. 7, the momentum of the moving bolt 58 through the opening 56 tears, through tear-out area 108, the forward flange 48 releasing the link 33 from the body structure 22. The bolt 58 may continue to tear through the rearward flange 50. The released link 33, which previously maintained position of the wheel assembly 24 in the lateral direction 42, allows the wheel assembly 24 to move laterally outward, so the wheel assembly 24 is directed into the rocker 32, which extends across the bottom of door opening 109. The rocker 32 absorbs the impact with minimized deformation to the body structure 22 of the vehicle 20.

Figure 8:
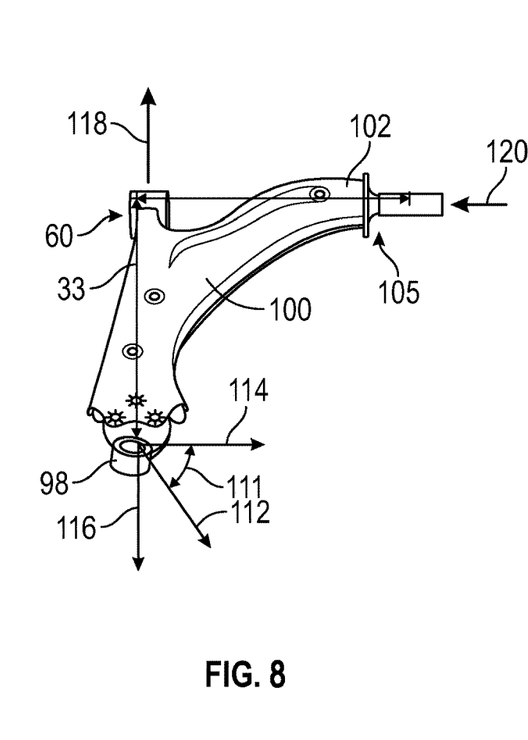
FIG. 8 is a schematic illustration of suspension loads for the vehicle of FIG. 1, in accordance with various embodiments.

Certain loads on the LCA 100 are schematically illustrated in FIG. 8, to which reference is additionally directed. A ball joint load 112 ($F_\alpha$) at an angle 111 ($\alpha$), is imparted on the LCA 100, which has a component 114 ($F_x$), in the longitudinal direction 40 and a component 116 ($F_y$), in the lateral direction 42. The component 116 is managed by the joint 60 as indicated by an offsetting reaction force 118 ($F_r$), in the lateral direction 42. The component 114 is managed by the joint 105 as indicated by an offsetting reaction force 120 in the longitudinal direction 40. The joint 60 is designed to withstand magnitudes of the reaction force 118 for all expected normal operational conditions of the vehicle 20, including CAL type cases, and is designed to provide a managed release in the event of any SOF type cases to provide favorable kinematics of the wheel assembly 24.

Figure 9:
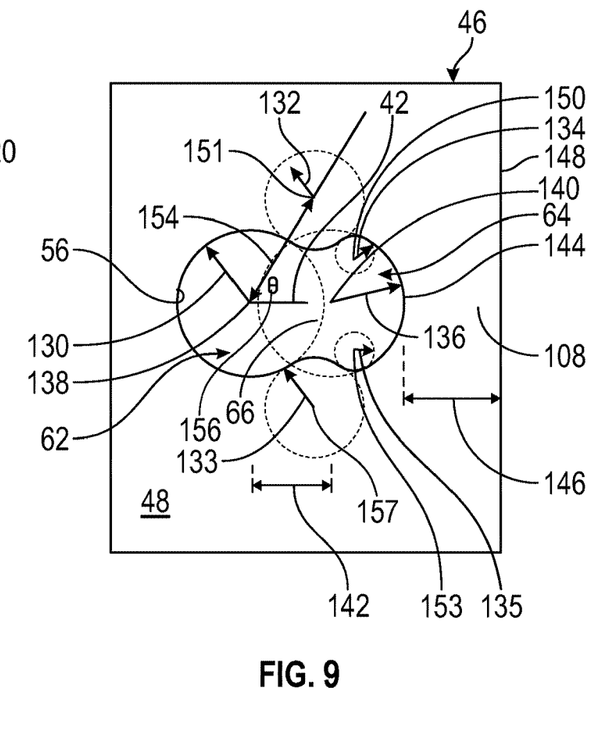
FIG. 9 is a detail view of the forward flange opening of the bracket of FIG. 2, in accordance with various embodiments.
Figure 10:
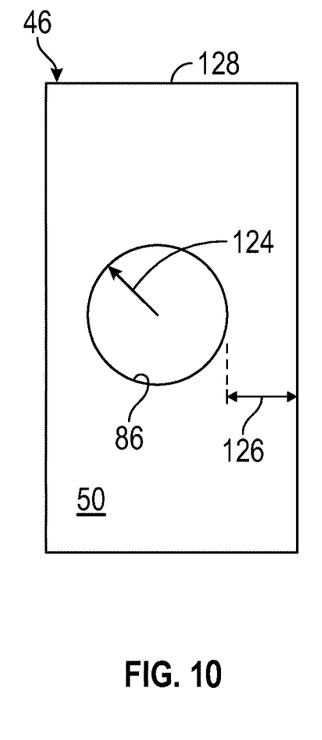
FIG. 10 is a detail view of the rearward flange opening of the bracket of FIG. 2, in accordance with various embodiments.

Referring to FIGS. 9 and 10, certain design parameters of the bracket 46 are identified. The forward flange 48 includes the opening 56, and the rearward flange 50 includes the opening 86. The flanges 48, 50 have a material composition and thickness selected for a stiffness and a strength required for the application. The opening 86 has a radius 124 (R1) and is located a distance 126 (L1) from the outboard edge 128 of the rearward flange 50. The radius 124 is selected to receive the shaft 84 of the bolt 58 and the distance 126 is selected to provide a strength, along with the material thickness and composition, to withstand design forces, while enabling a release in SOF type cases. The opening 56 includes the main region 62, which has a radius 130 (R2). The auxiliary region 64 is defined by radii 132 (R3), 134 (R4), and 136 (R5). The radii 130 and 136 are defined about centers 138, 140 spaced apart by a distance 142 (L2). The opening 56, and specifically its outboard end 144, is located a distance 146 (L3) from the outboard edge 148 of the forward flange 48 defining the tear-out area 108. The radii 132 are defined about centers 150, 152 located a distance 154 from the center 138 at an angle 156 (θ) relative to the lateral direction 42, to provide a select size to the passage 66. The radii 134 are defined about centers 151, 153 to provide a smooth transition to the perimeter of the auxiliary region 64.

Figure 11:
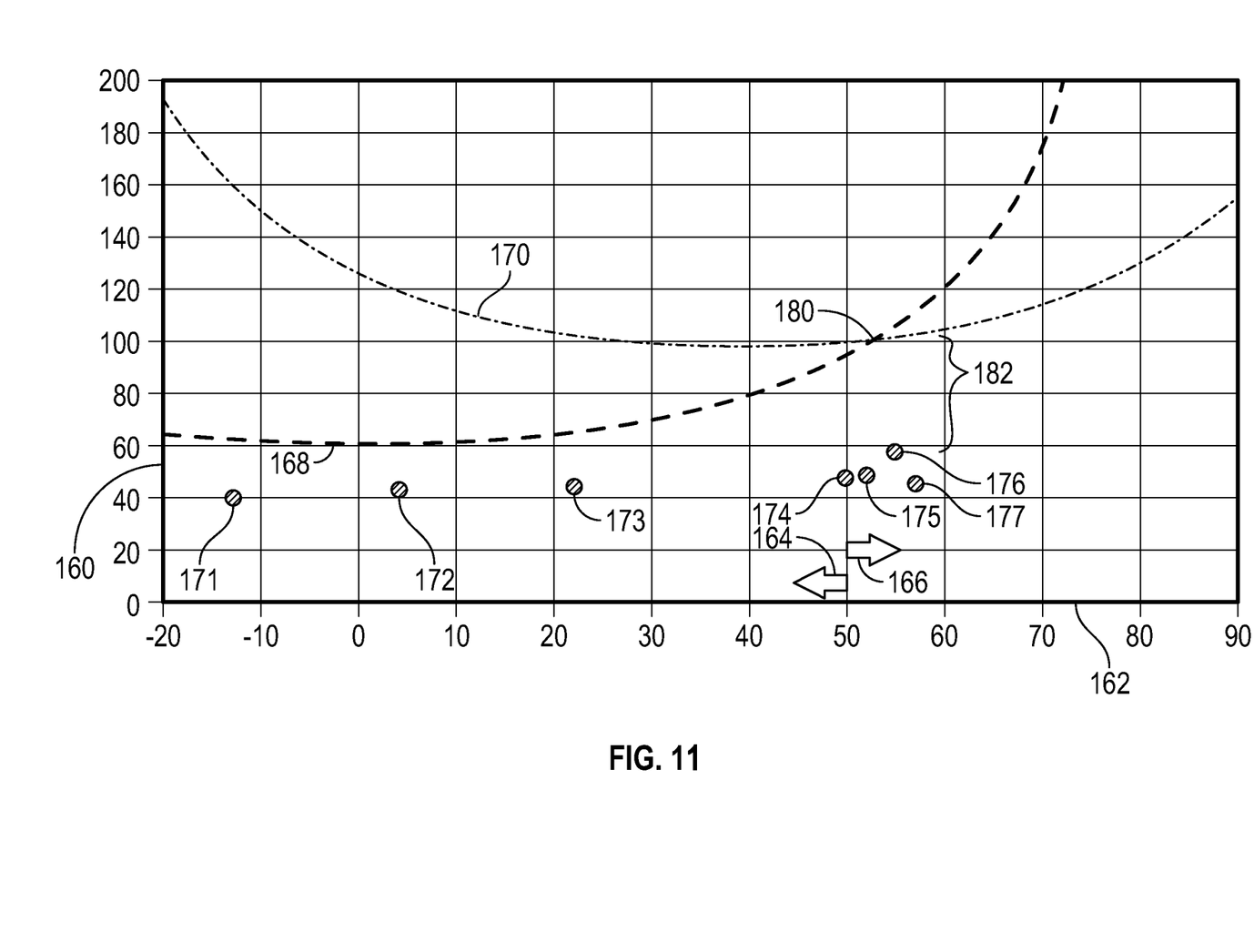
FIG. 11 is a graph of ball joint load in kilonewtons of the vertical axis versus ball joint load angle in degrees on the horizontal axis for the vehicle of FIG. 1, in accordance with various embodiments.

FIG. 11 demonstrates the determination of design parameters of the suspension system 28, and particularly of the bracket 46 and the LCA 100. Various conditions are considered including sustained integrity of the suspension system 28, buckling (bending of the material), of the LCA 100, and separation of the joint 60. FIG. 11 indicates ball joint loads 112 in kilonewtons on the vertical axis 160 and ball joint load angles 111 in degrees on the horizontal axis 162. For ball joint load angles 111 of up to the threshold angle, such as fifty-degrees, indicated at 164 and of a sufficient force, design conditions of buckling of the LCA 100 are selected with integrity of the joint 60 being maintained. This selection is consistent with operational conditions of scenarios other than SOF type cases, including CAL type cases. For SOF type cases of a sufficient force where the ball joint load angle is above the threshold angle 166 separation of the joint 60 is prescribed.

The set of data points 171-177 comprises CAL type and general durability case simulations. Curve 168 delineates the ball joint load 112 necessary to buckle the LCA 100 at various ball joint load angles 111. Curve 170 indicates strength of the joint 60 to withstand forces without release. In other words, for points below the curve 170, the joint 60 maintains its structural integrity, and for points above the curve 170 the joint 60 releases the link 33 from the engine cradle 26. This means for SOF type cases, the joint 60 is configured to release the link 33 from the vehicle's engine cradle 26 under loads above a threshold force and above a threshold angle at the ball joint 99. Selecting the design parameters described above of the bracket 46 for higher strength, would transition the curve 170 vertically up on the graph. Selecting the design parameters of the bracket 46 for lower strength, would transition the curve 170 vertically down on the graph.

The point 180 indicates the load and angle at which both buckling and release are enabled. For a selected set of design parameters of the bracket 46, the curve 170 demonstrates that the strength of the suspension system 28 maintains integrity against buckling or release with a margin 182 for CAL type cases. In other words, peak loads for CAL type cases are well below those that would be required for buckling of the LCA or for release of the joint 60 and so the suspension system 28 remains functionally and structurally intact. Curve 170 is set, by the selection of the design parameters including of the material and thickness of the bracket 46, and of the opening 56, so that the loads expected in SOF type cases will result in release of the joint 60. This is indicated as ball joint loads 112 above 100 kilonewtons for ball joint load angles 111 above the specified angle. In other cases, the LCA 100 buckles first prior to release of the joint 60.

Accordingly, systems are provided where joint release occurs under select conditions to provide preferred wheel kinematics and minimize/control vehicle body structural damage. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system comprising:
a vehicle body structure;
a bracket in the vehicle body structure:
a wheel assembly; and
a suspension system linking the wheel assembly to the vehicle body structure, including a link coupled with the vehicle body structure at the bracket through a first joint and coupled with the wheel assembly through a second joint,
wherein the first joint is configured to release the link from the bracket under loads above a threshold force at the first joint, to provide select kinematics of the wheel assembly, the threshold force varying depending on an angle at which the loads are applied to the first joint, wherein the first joint and the link are configured to maintain connection between the link and the bracket when the loads are under the threshold force, with the link buckling when the loads are above a link buckling force and the angle at the second joint is less than a threshold angle, wherein the first joint and the link are configured to release the link from the bracket when the loads are above the threshold force and the angle that is greater than the threshold angle.

2. The system of claim 1, wherein the link comprises a lower control arm configured to control movement of the wheel assembly relative to the vehicle body structure in both a longitudinal direction and a lateral direction.

3. The system of claim 1, comprising a bolt in the first joint, the bolt having a shaft diameter and connecting the link to the engine cradle, wherein the bracket defines an opening through which the bolt extends, the opening having a main region through which the bolt extends to couple the link with the bracket, and an auxiliary region joined with the main region by a passage, wherein the passage has a first width smaller than the shaft diameter of the bolt, and the auxiliary region has a second width that is larger than the first width, the first joint configured to hold the bolt in the main region and to enable the bolt to move through the passage to the auxiliary region to initiate a separation of the link from the engine cradle.

4. The system of claim 1, comprising a steering knuckle connected between the wheel assembly and the link, wherein the second joint is a ball joint at the steering knuckle and wherein the threshold angle is fifty degrees relative to a longitudinal direction of the engine cradle.

5. The system of claim 1, wherein the bracket includes a forward flange defining a first opening and a rearward flange defining a second opening, wherein the first opening includes a main section and an auxiliary section connected with the main section by a passage defined by a pair of projecting lips forming a necked-down section of the first opening at the passage, wherein the main section, the auxiliary section and the passage are contiguous and are defined by four reference radii defining arcs that overlap each other and that define a perimeter of the first opening.

6. The system of claim 5, wherein the forward flange includes an outboard end and a tear-out section between the first opening and the outboard end, the tear-out section configured to tear from the forward flange during the loads above the threshold force and above the threshold angle.

7. The system of claim 1, comprising a rocker in the vehicle body structure, the rocker configured with strength in a longitudinal direction of the vehicle body structure, wherein the select kinematics comprise directing the wheel assembly through a trajectory directed at the rocker in the longitudinal direction.

8. The system of claim 1, wherein the link is configured to buckle at the loads when greater than a buckling force of the link, when the loads are also directed at angles, relative to a vehicle longitudinal direction, of less than fifty-degrees.

9. The system of claim 1, wherein the bracket has a flange defining an opening, and comprising, a bushing with a bolt extending through the opening and the bushing to connect the link with the engine cradle.

10. The system of claim 9, wherein the opening has a main region and an auxiliary region joined with the main region by a passage, wherein the bolt is retained in the main region for load cases below the threshold force and the threshold angle.

11. A system comprising:
a vehicle body structure;
a bracket in the vehicle body structure:
a wheel assembly; and
a suspension system linking the wheel assembly to the engine cradle, including a link coupled with the bracket by a first joint and coupled with the wheel assembly through a second joint, wherein the first joint is configured to slip and fracture the bracket to release the link from the vehicle body structure at the first joint under loads, when the loads are above a release threshold force, wherein the release threshold force is predetermined and varies as a function of an angle at which the loads act at the second joint;

wherein the first joint is configured to maintain coupling between the link and the bracket without the slip, when the loads are below the threshold force, wherein the link and the first joint are configured for the link to buckle when the loads are above a buckling threshold force, wherein the buckling threshold force varies as a function of the angle at which the loads act at the second joint, wherein the link is configured to buckle when the angle is below a threshold angle, which is predetermined.

12. The system of claim 11, wherein the suspension system comprises a strut-type suspension system and the link comprises a lower control arm configured to control movement of the wheel assembly relative to the vehicle body structure in both a longitudinal direction and a lateral direction.

13. The system of claim 11, comprising a bolt in the first joint, the bolt having a shaft diameter and connecting the link to the bracket, wherein the bracket defines an opening through which the bolt extends, the opening having a main region and an auxiliary region joined with the main region by a passage, wherein the passage has a width smaller than a diameter of the bolt, the first joint configured to hold the bolt in the main region and to enable the bolt to move, by the slip, to the auxiliary region to initiate a separation of the link from the vehicle body structure by tearing a tear-out section of the bracket.

14. The system of claim 11, comprising a steering knuckle connected between the wheel assembly and the link, wherein the second joint is a ball joint at the steering knuckle and wherein the threshold angle is at the ball joint, relative to a longitudinal direction of the vehicle body structure.

15. The system of claim 11, wherein the bracket includes a forward flange defining a first opening and includes a rearward flange defining a second opening, wherein the first opening includes a main section and an auxiliary section connected with the main section by a passage defined by a pair of projecting lips forming a necked-down section of the first opening at the passage.

16. The system of claim 15, wherein the forward flange includes an outboard end and defines a tear-out section disposed between the first opening and the outboard end, the tear-out section configured to tear from the forward flange during the loads above both the threshold force and the threshold angle.

17. The system of claim 11, comprising a rocker defined across a bottom of a door opening of the vehicle body structure, wherein the select kinematics comprise directing the wheel assembly through the trajectory directed at the rocker in a longitudinal direction of the vehicle body structure.

18. The system of claim 11, wherein the first joint and the link are configured to maintain coupling between the link and the bracket without the slip, when the loads are above the buckling threshold force and below the release threshold force.

19. The system of claim 1, comprising a bushing and a bolt,
   wherein the bracket includes a flange defining an opening, with the bolt extending through the opening and the bushing to connect the link with the bracket,
   wherein the opening has a main region and an auxiliary region joined with the main region by a passage, and
   wherein the bolt is retained in the main region for loads below the release threshold force, when the angle is less than the threshold angle.

20. A system comprising:
   a vehicle body structure including a rocker, an engine cradle, and a bracket;
   a wheel assembly linked with the engine cradle; and
   a suspension system linking the wheel assembly to the engine cradle, including a link coupled with the engine cradle at the bracket by a first joint and coupled with the wheel assembly through a second joint,
   wherein the first joint is configured to release, by tearing of the bracket, the link from the vehicle body structure under loads on the wheel assembly above a threshold force to impart select kinematics to the wheel assembly including directing the wheel assembly through a trajectory toward the rocker to minimize deformation of the vehicle body structure, the threshold force varying depending on an angle at which the loads are applied to the first joint,
   wherein the first joint and the link are configured to maintain connection between the link and the bracket when the loads are under the threshold force, with the link buckling when the loads are above a link buckling force and the angle at the second joint is less than a threshold angle,
   wherein the first joint and the link are configured to release the link from the bracket when the loads are above the threshold force and the angle that is greater than the threshold angle.

* * * * *